(12) United States Patent
Lerner et al.

(10) Patent No.: US 7,204,599 B2
(45) Date of Patent: Apr. 17, 2007

(54) OFFSET PROJECTION SYSTEM

(75) Inventors: Scott A. Lerner, Corvallis, OR (US); Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 11/013,868

(22) Filed: Dec. 16, 2004

(65) Prior Publication Data

US 2006/0132726 A1    Jun. 22, 2006

(51) Int. Cl.
G03B 21/00 (2006.01)
G03B 21/20 (2006.01)
(52) U.S. Cl. ...................................... 353/102; 353/121
(58) Field of Classification Search .................. 353/30, 353/33, 34, 82, 102, 121; 359/618
See application file for complete search history.

(56) References Cited

U.S. PATENT DOCUMENTS

| | | | |
|---|---|---|---|
| 3,637,308 A | 1/1972 | Van Raalte et al. | |
| 3,704,936 A | 12/1972 | Gorkiewicz et al. | |
| 4,875,777 A | 10/1989 | Harding | |
| 5,299,289 A | 3/1994 | Omae et al. | |
| 5,422,691 A | 6/1995 | Ninomiya et al. | |
| 5,692,819 A | 12/1997 | Mitsutake et al. | |
| 5,754,260 A | 5/1998 | Ooi et al. | |
| 5,826,960 A | 10/1998 | Gotoh et al. | |
| 6,046,858 A | 4/2000 | Scott et al. | |
| 6,050,689 A | 4/2000 | Nakamura et al. | |
| 6,076,931 A | 6/2000 | Bone et al. | |
| 6,113,240 A | 9/2000 | Iizuka | |
| 6,224,215 B1 | 5/2001 | Maximus et al. | |
| 6,536,903 B2 | 3/2003 | Bone | |
| 6,628,355 B1 | 9/2003 | Takahara | |
| 6,688,748 B2 | 2/2004 | Lewis et al. | |
| 6,801,362 B1 * | 10/2004 | Brown | 359/618 |
| 6,824,275 B2 * | 11/2004 | Penn | 353/81 |
| 2002/0180935 A1 | 12/2002 | Bone | |

* cited by examiner

Primary Examiner—Rodney Fuller

(57) ABSTRACT

A projection system comprising an illumination relay, a coupling lens, a modulation device, and a projection lens is provided. The illumination relay is configured to provide an illumination beam to the coupling lens along an illumination path having a first optical axis. The coupling lens is configured to direct the illumination beam onto the modulation device. The modulation device is configured to modulate the illumination beam to form an imaging beam and reflect the imaging beam into the coupling lens. The coupling lens is configured to direct the imaging beam into the projection lens along a projection path having a first optical axis such that the second optical axis is substantially parallel with the first optical axis.

26 Claims, 4 Drawing Sheets

OFFSET PROJECTION SYSTEM

BACKGROUND

Optical architectures of digital projectors typically include an illumination system, projection system, an optical modulator and one or more devices that couple the illumination system, projection system and the optical modulator. The illumination system illuminates the optical modulator. The optical modulator produces images by modulating the light falling across it by either reflecting or transmitting the light. The projection system images the optical modulator on the screen by capturing the modulated illumination of the optical modulator.

Generally, optical architectures have the optical axes of the projection and illumination paths either overlapping (across a portion of the system) or tilted substantially with respect to each other. For those systems that require or might benefit from a relatively on-axis or small incident angle illumination and projection paths on the optical modulator plane, such architectures may be inefficient, noisy, bulky or expensive. It would be desirable to be able to obtain high efficiency and low stray light in a compact package at a low cost in an optical architecture.

SUMMARY

One form of the present invention provides a projection system comprising an illumination relay, a coupling lens, a modulation device, and a projection lens. The illumination relay is configured to provide an illumination beam to the coupling lens along an illumination path. The coupling lens is configured to direct the illumination beam onto the modulation device. The modulation device is configured to modulate the illumination beam to form an imaging beam and reflect the imaging beam into the coupling lens. The coupling lens is configured to direct the imaging beam into the projection lens along a projection path that is substantially parallel with the illumination path.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

As described herein, an optical architecture is provided for a digital projector that sets the optical axes of an illumination system and a projection system to be parallel and offset with respect to each other using a coupling lens. The coupling lens allows the sharing of projection and illumination path spaces while maintaining the separation of the actual projection and illumination beams. By doing so, the architecture effectively separates the illumination and projection beam paths throughout the system.

Figure 1:
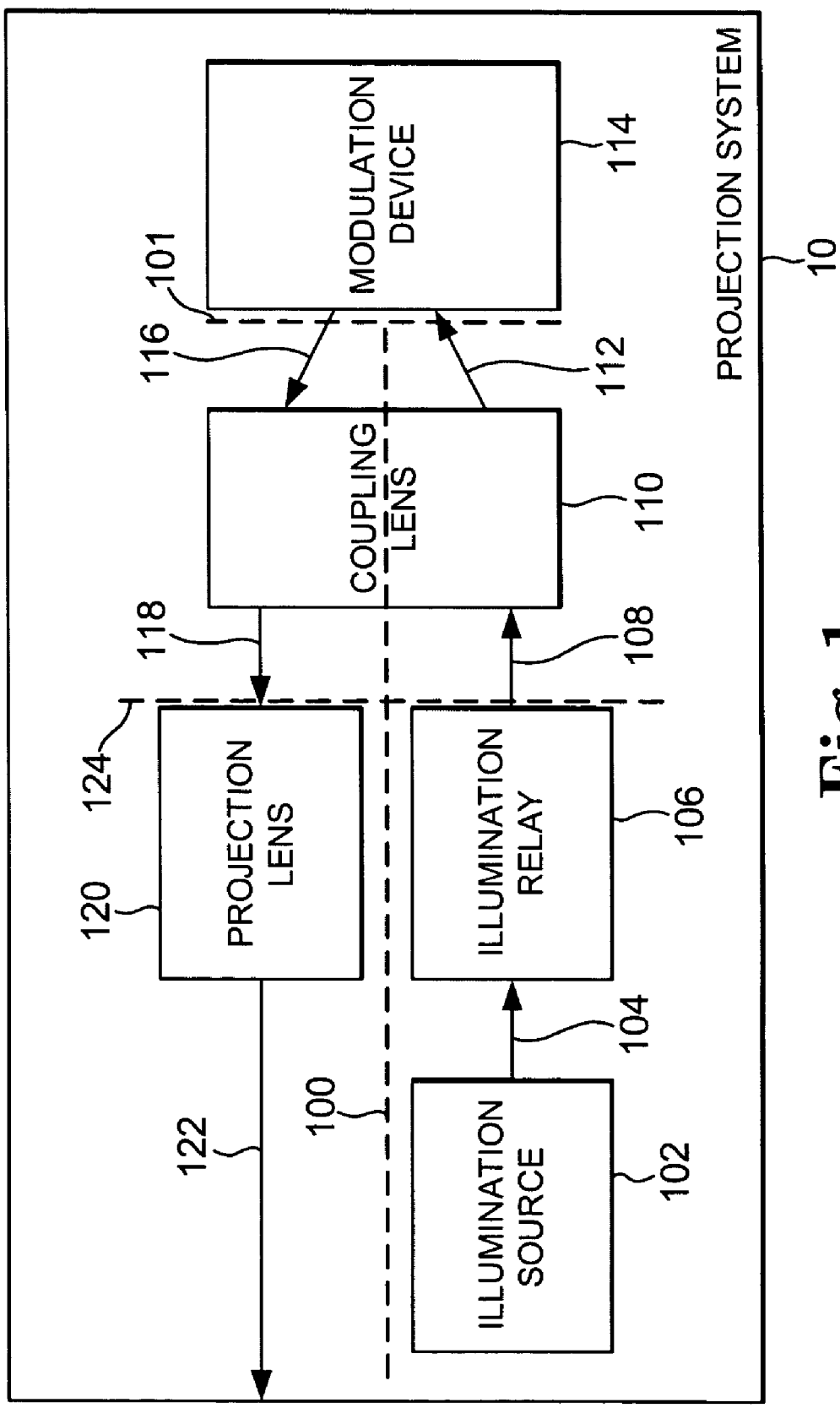
FIG. 1 is a block diagram illustrating an offset digital projection system according to one embodiment of the present invention.

FIG. 1 is a block diagram illustrating one embodiment of an offset digital projection system 10. In projection system 10, an illumination source 102 generates and emits an illumination beam to an illumination relay 106 along an optical path 104. Illumination relay 106 integrates and collimates the illumination beam and provides the illumination beam to a coupling lens 110 along an illumination path 108 such that an optical axis of illumination path 108 is parallel or substantially parallel to a normal 100 to a plane 101 of a modulation device 114. Normal 100 is substantially perpendicular to plane 101, and plane 101 aligns with the modulating elements (not shown) of modulation device 114. Coupling lens 110 directs and focuses the illumination beam onto modulation device 114 along an illumination path 112. Illumination relay 106 images illumination source 102 onto modulation device 114 via coupling lens 110 such that modulation device 114 is uniformly illuminated with minimum overfill. Coupling lens 110 directs the illumination beam onto modulation device 114 at a non-zero angle of incidence. Coupling lens 110 is substantially centered with respect to modulation device 114.

Modulation device 114 modulates the illumination beam from coupling lens 110 according to an input signal, e.g., a computer or video input signal, (not shown) to form an imaging beam. The imaging beam is reflected from modulation device 114 through coupling lens 110 along an optical path 116. Coupling lens 110 directs the imaging beam from modulation device 114 through a projection lens 120 along a projection path 118 that an optical axis of projection path 118 is parallel or substantially parallel to normal 100 and the optical axis of illumination path 108. Projection lens 120 focuses and may zoom the imaging beam along an optical path 122 to cause still or video images to be formed on a screen or other display surface. Projection lens 120 images modulation device 114 through coupling lens 110 onto the screen or other display surface used for final display.

In projection system 10, illumination relay 106, coupling lens 110, and projection lens 120 are situated so as to minimize the overlap of the illumination and imaging beams along illumination path 108 and projection path 118. In particular, the illumination beam and the imaging beam each intersect different areas of an optical pupil plane 124 of the system such that the imaging beam is spatially separated from the illumination beam at pupil plane 124. Accordingly, illumination path 108 is effectively separated from projection path 118. As shown in FIG. 1, coupling lens 110 includes all optical elements between pupil plane 124 and modulation device 114.

Illumination source 102 may be a mercury ultra high pressure, xenon, metal halide, or other suitable projector lamp that provides a monochromatic or polychromatic illumination beam. Modulation device 114 transmits or reflects selected portions of the illumination beam through coupling lens 110 and projection lens 120 in response to an image input signal (not shown) to cause images to be projected onto a screen or other surface. Modulation device 114 comprises at least one digital modulator such as a spatial light modulator like LCos, liquid crystal display (LCD), digital micromirror display (DMD) or other type. In one embodiment, modulation device 114 includes a separate digital modulator for each color, e.g., red, blue, and green.

Figure 2:
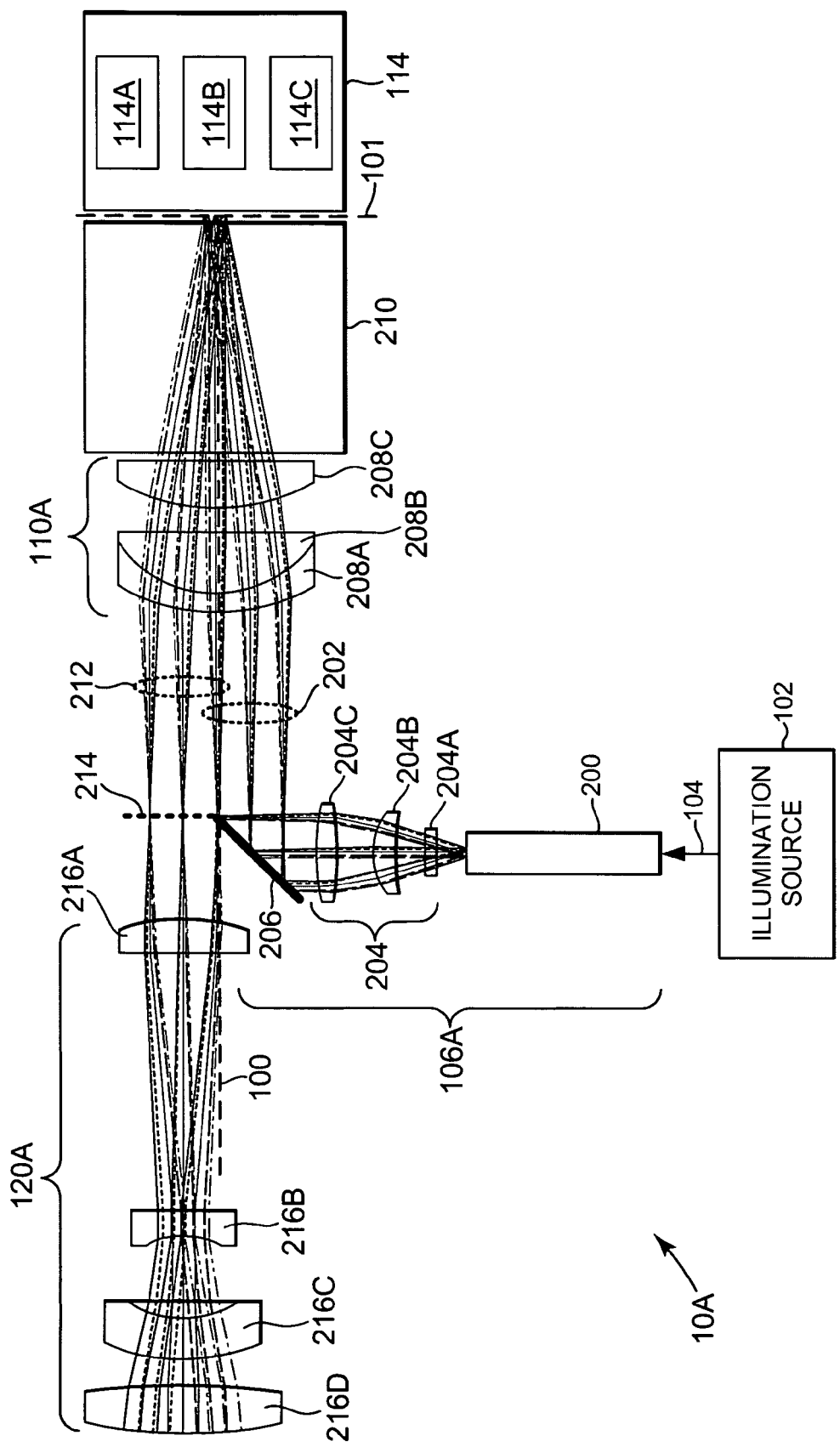
FIG. 2 is a schematic diagram illustrating an offset digital projection system according to one embodiment of the present invention.

FIG. 2 is a schematic diagram illustrating one embodiment of an offset digital projection system 10A. In projection system 10A, illumination source 102 generates and emits an illumination beam 202 to an illumination relay 106A along an optical path 104. Illumination relay 106A includes an integrating rod 200 that integrates illumination beam 202 and an illumination lens 204 that collimates illumination beam 202 and provides illumination beam 202 to a fold mirror 206. Illumination lens 204 includes lenses 204A, 204B, and 204C.

Fold mirror 206 reflects illumination beam 202 from illumination lens 204 through a coupling lens 110A along an illumination path such that an optical axis of the illumination path of illumination beam 202 is parallel or substantially parallel to an optical axis of modulation device 114 between fold mirror 206 and coupling lens 110A. In the embodiment shown in FIG. 2, fold mirror 206 reflects illumination beam 202 at an angle of approximately ninety degrees between the optical axis of illumination lens 204 and the optical axis of coupling lens 110A. In other embodiments, fold mirror 206 may be positioned differently to reflect illumination beam 202 at any non-zero angle between the optical axis of illumination lens 204 and the optical axis of coupling lens 110A.

Coupling lens 110A refracts and focuses illumination beam 202 onto modulation device 114 through a beamsplitter 210. Beamsplitter 210 separates illumination beam 202 into separate components (e.g., red, blue, and green components) that are provided to different modulators 114A, 114B, and 114C of modulation device 114. Modulators 114A, 114B, and 114C may be set in any suitable arrangement with respect to beamsplitter 304. Beamsplitter 210 may be a dichroic prism, a dichroic plate, a dichroic x-cube, or other element configured to separate illumination beam 202 into separate components. Beamsplitter 210 may be omitted in embodiments where modulation device 114 includes a single modulator. Coupling lens 110A refracts illumination beam 202 onto modulation device 114 at a non-zero angle of incidence. Coupling lens 110A, as shown, includes three lenses: 208A, 208B and 208C to refract illumination beam 202. In other embodiments, coupling lens 110A may be a combination of one or more spherical or aspherical lenses.

Modulation device 114 modulates the illumination beam from coupling lens 110A according to an input signal, e.g., a computer or video input signal, (not shown) to form an imaging beam 212. Imaging beam 212 is reflected from modulation device 114 through beamsplitter 210 and into coupling lens 110A. Coupling lens 110A refracts imaging beam 212 from modulation device 114 through a projection lens 120A using lenses 208A, 208B, and 208C such that imaging beam 212 travels along an optical axis of a projection path that is parallel or substantially parallel to normal 100 to plane 101 of modulation device 114 and an optical axis of the illumination path of illumination beam 202 between coupling lens 110A and an optical pupil plane 214.

Projection lens 120A focuses and may zoom imaging beam 212 along an optical path to cause still or video images to be formed on a screen or other display surface. Projection lens 120A, as shown, includes four lenses: 216A, 216B, 216C, and 216D. In other embodiments, projection lens 120A may be a combination of one or more spherical or aspherical lenses or mirrors.

In projection system 10A, illumination relay 106A, coupling lens 110A, and projection lens 120A are situated so as to minimize the overlap of illumination beam 202 and imaging beam 212 along the respective illumination and projection paths. In particular, the illumination beam and the imaging beam each intersect different areas of pupil plane 214 of the system such that imaging beam 212 is spatially separated from illumination beam 202 at pupil plane 214. Accordingly, the illumination path is effectively separated from the projection path. As shown in FIG. 2, coupling lens 110A comprises all optical elements between pupil plane 214 and modulation device 114.

Figure 3:
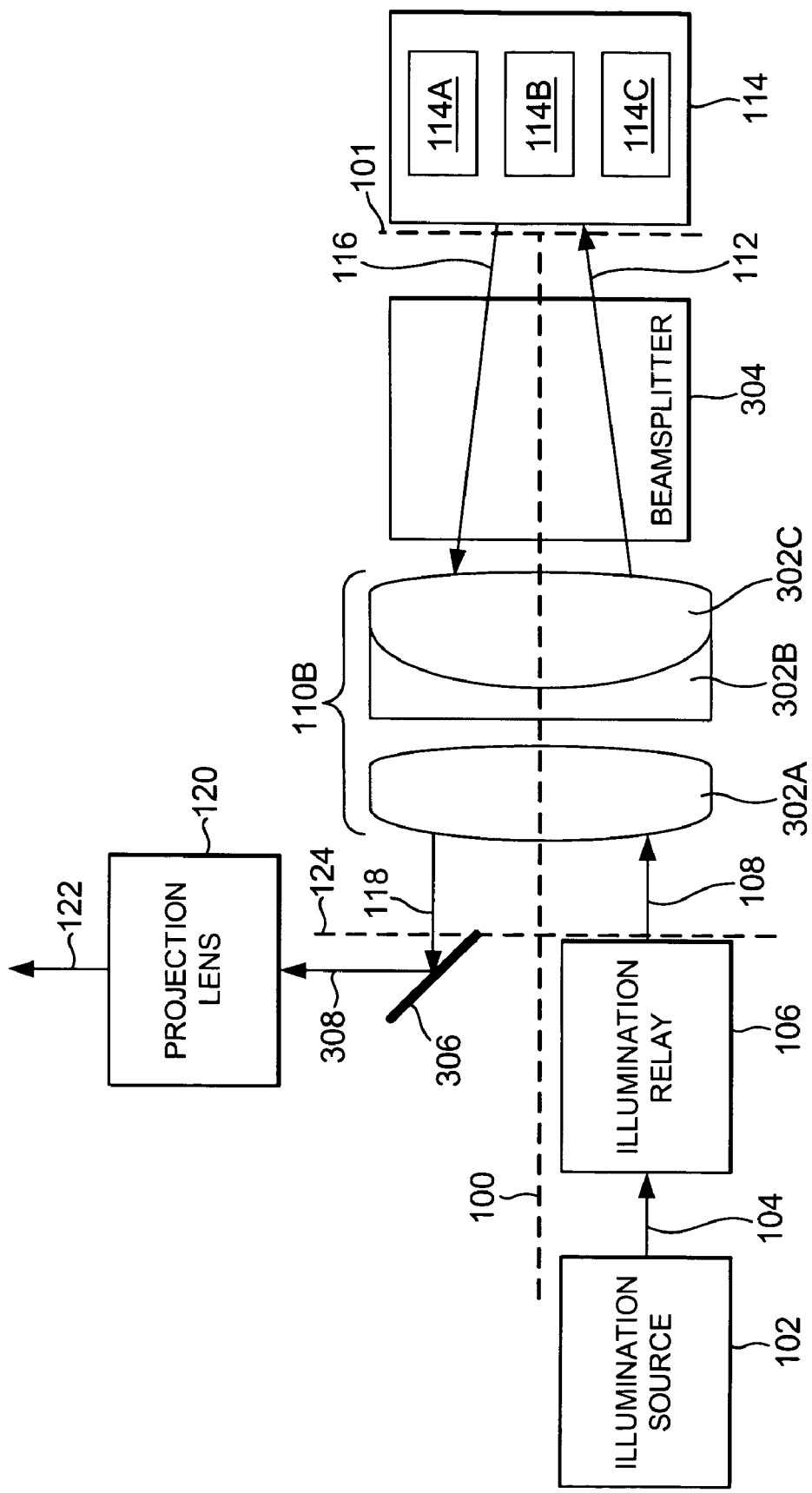
FIG. 3 is a schematic diagram illustrating an offset digital projection system according to one embodiment of the present invention.

FIG. 3 is a schematic diagram illustrating one embodiment of an offset digital projection system 10B. In projection system 10B, illumination source 102 generates and emits an illumination beam to illumination relay 106 along an optical path 104. Illumination relay 106 integrates and collimates the illumination beam and provides the illumination beam to coupling lens 110B along an illumination path 108 such that an optical axis of illumination path 108 is parallel or substantially parallel to normal 100 to plane 101 of modulation device 114 between illumination relay 106 and coupling lens 110B.

Coupling lens 110B refracts and focuses the illumination beam onto modulation device 114 through a beam splitter 304. Beam splitter 304 separates the illumination beam into separate components (e.g., red, blue, and green components) that are provided to different modulators 114A, 114B, and 114C of modulation device 114. Modulators 114A, 114B, and 114C may be set in any suitable arrangement with respect to beamsplitter 304. Beamsplitter 304 may be a dichroic prism, a dichroic plate, a dichroic x-cube, or other element configured to separate the illumination beam into separate components. Beamsplitter 304 may be omitted in embodiments where modulation device 114 includes a single modulator. Coupling lens 110B refracts the illumination beam onto modulation device 114 at a non-zero angle of incidence as indicated by an optical path 112. Coupling lens 110B, as shown, includes three lenses: 302A, 302B and 302C to refract the illumination beam. In other embodiments, coupling lens may be a combination of one or more spherical or aspherical lenses.

Modulation device 114 modulates the illumination beam from coupling lens 110A according to an input signal, e.g., a computer or video input signal, (not shown) to form an imaging beam. The imaging beam is reflected from modulation device 114 along an optical path 116 through beamsplitter 304 and into coupling lens 110B. Coupling lens 110B refracts the imaging beam from modulation device 114 to a fold mirror 306 using lenses 302A, 302B, and 302C such that the imaging beam travels along an optical axis of a projection path 118 that is parallel or substantially parallel to normal 100 to plane 101 of modulation device 114 and an optical axis of illumination path 108 of the illumination beam.

Fold mirror 306 reflects the imaging beam from coupling lens 110B into projection lens 120 along an optical path 308. In the embodiment shown in FIG. 3, fold mirror 306 reflects the imaging beam at an angle of approximately ninety degrees between normal 100 and optical axis 308 of projection lens 120. In other embodiments, fold mirror 306 may be positioned differently to reflect the imaging beam at any non-zero angle between normal 100 and optical axis 308 of projection lens 120. Projection lens 120 focuses and may zoom the imaging beam from fold mirror 306 along optical path 122 to cause still or video images to be formed on a screen or other display surface.

In projection system 10B, illumination relay 106, coupling lens 110B, and projection lens 120 are situated so as to minimize the overlap of the illumination and imaging beams along illumination path 108 and projection path 118. In particular, the illumination beam and the imaging beam each intersect different areas of pupil plane 124 of the system such that the imaging beam is spatially separated from the illumination beam at pupil plane 124. Accordingly, illumination path 108 is effectively separated from projection path 118.

Figure 4:
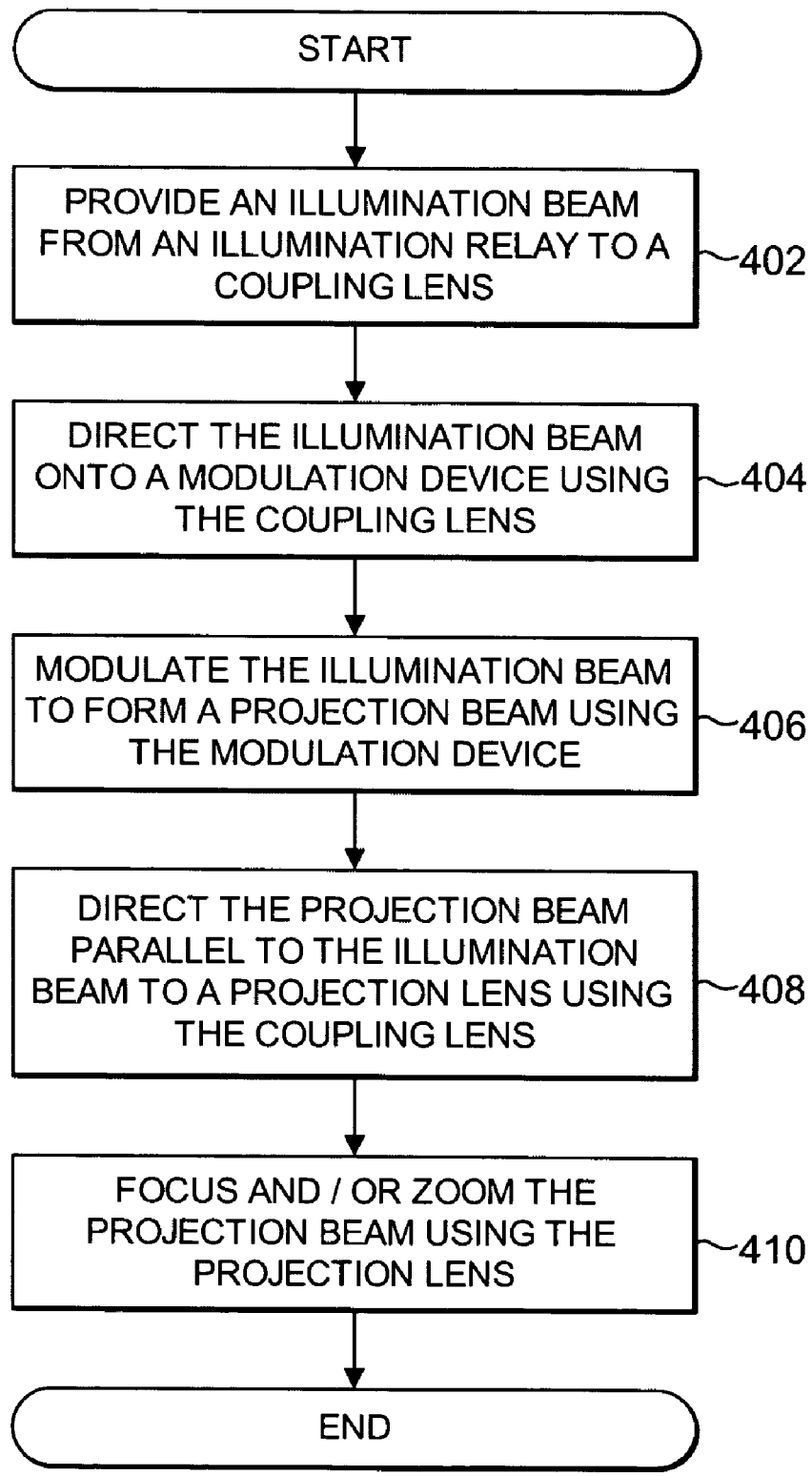
FIG. 4 is a flow chart illustrating a method for projecting an image using an offset digital projection system according to one embodiment of the present invention.

FIG. 4 is a flow chart illustrating one embodiment of a method for projecting an image using an offset projection system. In FIG. 4, an illumination beam is provided from an illumination relay to a coupling lens as indicated in a block 402. The illumination beam is directed onto a modulation device using the coupling lens as indicated in a block 404. The illumination beam is modulated to form an imaging beam using the modulation device as indicated in a block 406. The imaging beam is directed parallel or substantially parallel to the illumination beam and a normal to the plane of the modulation device to a projection lens using the coupling lens as indicated in a block 408. The imaging beam is focused and may be zoomed in or out using the projection lens as indicated in a block 410.

In other embodiments, one or both of fold mirrors 206 and 306 may replaced with other reflective surfaces. In addition, a system may include fold mirrors in both the illumination and projection paths in other embodiments.

An offset optical architecture as described herein may effectively separate the illumination and projection paths while maintaining the optical performance and highest possible efficiency and minimizing stray light. This architecture may also avoid complex and expensive optical components and may allow for a compact package that has a maximum number of small sized lenses to achieve a low cost compact system.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the optical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A projection system comprising:
    an illumination relay;
    a coupling lens;
    a modulation device;
    a fold mirror; and
    a projection lens;
    wherein the illumination relay is configured to provide an illumination beam to the coupling lens along an illumination path having a first optical axis, wherein the coupling lens is configured to direct the illumination beam onto the modulation device, wherein the modulation device is configured to modulate the illumination beam to form an imaging beam and reflect the imaging beam into the coupling lens, wherein the coupling lens is configured to direct the imaging beam to the fold mirror along a projection path having a second optical axis that is substantially parallel and offset with the first optical axis, and wherein the fold mirror is configured to reflect the imaging beam along a third optical axis of the projection lens such that the third optical axis forms a non-zero angle with a normal to a plane of the modulation device.

2. The projection system of claim 1 wherein the first optical axis and the second optical axis are substantially parallel with the normal to the plane of the modulation device.

3. The projection system of claim 1 wherein the illumination beam intersects a first area of a pupil plane, and wherein the imaging beam intersects a second area of the pupil plane that is substantially separate from the first area.

4. The projection system of claim 1 wherein the fold mirror is configured to reflect the projection beam from the coupling lens to the projection lens.

5. The projection system of claim 4 wherein the fold mirror is configured to reflect the projection beam from the coupling lens to the projection lens at an angle of approximately ninety degrees between the third optical axis of the projection lens and the normal.

6. The projection system of claim 1 wherein the coupling lens includes at least one refractive element configured to refract the illumination beam onto the modulation device and refract the imaging beam to the fold mirror.

7. A system comprising:
    an illumination relay configured to provide an illumination beam along an illumination path having a first optical axis;
    a modulation device configured to modulate the illumination beam to form an imaging beam;
    a fold mirror;
    a projection lens; and
    means for directing the illumination beam from the illumination relay onto the modulation device and for directing the imaging beam from the modulation device to the fold mirror along a projection path having a second optical axis such that the second optical axis is substantially parallel with the first optical axis;
    wherein the fold mirror is configured to reflect the imaging beam along a third optical axis of the projection lens such that the third optical axis forms a non-zero angle with a normal to a plane of the modulation device.

8. The system of claim 7 wherein the first optical axis and the second optical axis are substantially parallel with the normal to the plane of the modulation device.

9. The system of claim 7 wherein the illumination beam intersects a first area of a pupil plane, and wherein the imaging beam intersects a second area of the pupil plane that is substantially separate from the first area.

10. The system of claim 7 wherein the fold mirror is configured to reflect the projection beam from the means for directing the illumination beam to the projection lens.

11. The system of claim 10 wherein the fold mirror is configured to reflect the projection beam from the means for directing the illumination beam to the projection lens at an angle of approximately ninety degrees between the third optical axis of the projection lens and the normal.

12. The system of claim 10 wherein the modulation device comprises a plurality of modulators.

13. A method comprising:
    providing an illumination relay configured to provide an illumination beam along an illumination path having a first optical axis;

providing a modulation device configured to modulate the illumination beam to form an imaging beam;

providing a coupling lens configured to direct the illumination beam onto the modulation device and direct the imaging beam along a projection path having a second optical axis such that the second optical axis is substantially parallel with the first optical axis;

providing a fold mirror configured to reflect the imaging beam from the projection path along a third optical axis that forms a non-zero angle with a normal to a plane of the modulation device; and providing a projection lens configured to receive the imaging beam from the fold mirror along the third optical axis.

14. The method of claim 13 wherein the first optical axis and the second optical axis are substantially parallel with the normal to the plane of the modulation device.

15. The method of claim 13 wherein the illumination beam intersects a first area of a pupil plane, and wherein the imaging beam intersects a second area of the pupil plane that is substantially separate from the first area.

16. The method of claim 13 wherein the non-zero angle is approximately ninety degrees.

17. A method comprising:

providing an illumination beam along an illumination path having a first optical axis to a coupling lens;

directing the illumination beam from the illumination path onto a modulation device using a coupling lens;

generating an imaging beam from the illumination beam using the modulation device;

directing the imaging beam from the modulation device along a projection path having a second optical axis using the coupling lens such that the second optical axis is substantially parallel with the first optical axis; and reflecting the imaging beam to a projection lens having a third optical axis that forms a non-zero angle with a normal to a plane of the modulation device.

18. The method of claim 17 further comprising:

directing the imaging beam from the modulation device along the projection path by refracting the image beam.

19. The method of claim 17 wherein the first optical axis and the second optical axis are substantially parallel with the normal to the plane of the modulation device.

20. The method of claim 17 wherein the illumination beam intersects a first area of a pupil plane, and wherein the imaging beam intersects a second area of the pupil plane that is substantially separate from the first area.

21. The method of claim 17 wherein the non-zero angle is approximately ninety degrees.

22. A system comprising:

a coupling lens;

a modulation device; and a fold mirror;

wherein the coupling lens is configured to receive an illumination beam along a first path having a first optical axis, wherein the coupling lens is configured to direct the illumination beam onto the modulation device, wherein the modulation device is configured to modulate the illumination beam to form an imaging beam and reflect the imaging beam into the coupling lens, wherein the coupling lens is configured to direct the imaging beam along a second path having a second optical axis that is substantially parallel and offset with the first optical axis, and wherein the fold mirror is configured to reflect the imaging beam from the second optical axis along a third path having a third optical axis that forms a non-zero angle with a normal to a plane of the modulation device.

23. The system of claim 22 wherein the first optical axis and the second optical axis are substantially parallel with the normal to the plane of the modulation device.

24. The system of claim 22 wherein the illumination beam intersects a first area of a pupil plane, and wherein the imaging beam intersects a second area of the pupil plane that is substantially separate from the first area.

25. The system of claim 22 wherein the coupling lens includes at least one refractive element configured to refract the illumination beam onto the modulation device and refract the imaging beam along the second path.

26. The system of claim 22 wherein the non-zero angle is approximately ninety degrees.

* * * * *